United States Patent [19]
Van der Eijk

[11] 3,869,522

[45] Mar. 4, 1975

[54] AROMATICS HYDROGENATION PROCESS

[75] Inventor: Huno Van der Eijk, Amsterdam, Netherlands

[73] Assignee: Shell Oil Company, Houston, Tex.

[22] Filed: June 18, 1973

[21] Appl. No.: 371,024

[30] Foreign Application Priority Data
July 17, 1972 Netherlands .................. 7209847

[52] U.S. Cl. ............................................. 260/667
[51] Int. Cl. ............................................. C07c 5/10
[58] Field of Search ................................. 260/667

[56] References Cited
UNITED STATES PATENTS

| | | | |
|---|---|---|---|
| 3,260,762 | 7/1966 | Cabbege | 260/667 |
| 3,699,036 | 10/1972 | Hass et al. | 260/667 |

Primary Examiner—C. Davis
Attorney, Agent, or Firm—John M. Duncan; Ronald R. Reper

[57] ABSTRACT

Aromatic hydrocarbons are hydrogenated over a catalyst containing Group VIII noble metals supported on a carrier comprising 30–90% wt silica, 10–70% wt zirconia and 0–25% alumina.

6 Claims, No Drawings

AROMATICS HYDROGENATION PROCESS

BACKGROUND OF THE INVENTION

The present invention relates to a process for the hydrogenation of aromatic hydrocarbons using a noble metal catalyst.

The catalytic hydrogenation of aromatic hydrocarbons is a known process; it is used, inter alia, for the preparation of cyclohexane from crude benzene, for improving the smoke point of kerosines and for increasing the heat of combustion of jet fuels. Use is made for these processes both of catalysts which contain sulfides of the metals nickel, cobalt, molybdenum and tungsten and catalysts which contain noble metals of Group VIII. Compared with the sulfidic catalysts, the noble metal catalysts possess a higher activity for the hydrogenation of aromatic hydrocarbons and therefore require a lower reaction temperature to achieve a given conversion. It is attractive to carry out these processes at low temperature since cracking reactions begin to play an increasingly important role with increasing temperatures, as a result of which the yield of desired product falls and the hydrogen consumption rises. The noble metal catalysts proposed until now for the hydrogenation of aromatic hydrocarbons contain one or more noble metals of Group VIII supported on an amorphous oxide of the elements of Groups II, III and IV or on a mixture of these oxides, such as silica, alumina, silica-alumina and alumina-boria. See, e.g., U.K. Pat. No. 1,021,321 (Pt on silica-alumina) and U.S. Pat. No. 3,057,807 (Pt on alumina-boria). A catalyst which is used on a large scale for the hydrogenation of aromatic hydrocarbons is platinum on alumina.

THE INVENTION

A study of the activity of noble metal catalysts supported on carriers for the hydrogenation of aromatic hydrocarbons has shown that the activity of these catalysts is substantially determined by the nature of the carrier material. It has been found that noble metal catalysts on a carrier comprising 30–90% by weight of silica, 10–70% by weight of zirconia and 0–25% by weight of alumina possess a considerably higher activity for the hydrogenation of aromatic hydrocarbons than noble metal catalysts with the same metal load but supported on one of the conventional carriers, such as silica, alumina or silica-alumina.

The instant process offers, inter alia, the advantage that, in order to achieve a specific conversion by means of a catalyst having a given metal load, the process can be carried out at lower temperature and/or lower pressure and/or higher space velocity than is possible when using a catalyst with the same metal load which contains, for example, silica, alumina, or silica-alumina as carrier. The process is of particular importance since it is now possible to use a catalyst with a considerably lower metal load in order to achieve a specific conversion under given reaction conditions than is the case when using a catalyst which contains, for example, silica, alumina or silica-alumina as carrier. This latter feature of the process is of great economic importance, since the price of noble metal catalysts on carriers is determined almost entirely by the price of the noble metal and only to a very small extent by the price of the carrier.

The catalysts contain one or more noble metals of Group VIII on a carrier containing silica, zirconia and possibly alumina. The amount of Group VIII noble metal present on the carrier may vary between wide limits, but is usually 0.01–10% by weight. The Group VIII noble metals which may be present on the carrier are platinum, palladium, rodium, ruthenium, iridium and osmium, preference being given to platinum. If desired, two or more of these metals may be present in the catalyst. The amount of Group VIII noble metal present in the catalyst is preferably 0.05–5% by weight and in particular 0.1–2% by weight.

The catalyst carriers comprise 30–90% by weight of silica and 10–70% by weight of zirconia. The carriers may additionally contain up to 25% by weight of alumina. Preference is given to carriers with a silica content which is at least equal to the zirconia content. If the carrier also contains alumina, a carrier is preferably selected of which the alumina content is lower than the zirconia content. Preference is further given to catalysts having a pore volume of 0.3–1.2 ml/g and a specific surface area of 100–600 m$^2$/g.

The catalysts may be prepared by any process known in the art for the preparation of catalysts which contain one or more noble metals on a carrier. The catalysts are preferably prepared by impregnating a silica-zirconia or silica-zirconia-alumina carrier with an aqueous solution containing one or more noble metal compounds and drying and calcining the resultant composition. Suitable silica-zirconia-alumina carriers may, for example, be prepared by simultaneous precipitation of silica and zirconia, or silica, zirconia and alumina, respectively, or by impregnating a silica with a solution of a zirconium compound or with a solution of a zirconium compound and an aluminum compound and subsequently drying and calcining the material.

The silica-zirconia and silica-zirconia-alumina carriers are preferably prepared by precipitating zirconia or zirconia and alumina on a silica hydrogel and subsequently drying and calcining the material. This preparation is preferably carried out starting from an aqueous silicate solution (for example water-glass), lowering its pH such that a silica hydrogel precipitates, aging the silica hydrogel, adding an aqueous solution of a zirconium compoumd or an aqueous solution of a zirconium compound and an aluminum compound, increasing the pH such that zirconia or zirconia and alumina precipitate(s) on the silica hydrogel, and drying and calcining. Aging of the silica hydrogel can suitably be effected by storing the gel for 4–200 hours at a pH between 7 and 11 at elevated temperature. During aging the pore volume of the silica hydrogel increases and the specific surface area decreases, thus making the material more suitable for catalytic purposes.

If desired, the catalysts may contain a halogen, for example fluorine.

The process is very suitable for hydrogenation of low-sulfur aromatic hydrocarbons and aromatics-containing hydrocarbon oil fractions originating from the oil and bitumen industry, such as crude benzene and petroleum distillates with a final boiling point below 375°C. If the feedstock has an excessive sulfur content, this can be decreased by subjecting the feedstock to catalytic desulfurization before applying the process. Examples of aromatics-containing petroleum distillates for which the process can suitably be used are fractions which, after hydrogenation of the aromatics present therein, are suitable for use as aromatics-free solvents, illuminating oils with improved smoke point, jet fuels with increased heat of combustion and diesel fuels with increased cetane number. It is self-evident that it is not necessary to hydrogenate the entire feedstock if only a slight improvement of, for example, the smoke point or the cetane number is required. In such cases it is sufficient to hydrogenate only a part of the feedstock and to mix the hydrogenated part with the untreated part.

The process is also very suitable for use in the second stage of a two-stage process for the preparation of medicinal oils by catalytic hydrotreating suitable mineral oil fractions, preferably extracted by means of a selective solvent for aromatics, by the application of a sulfidic catalyst containing nickel and/or cobalt and in addition molybdenum and/or tungsten on a carrier in the first stage. Examples of catalysts suitable for use in the first stage of the above-mentioned two-stage process are:

a. a catalyst prepared by impregnating a carrier with a solution comprising one or more nickel and/or cobalt compounds, one or more molybdenum and/or tungsten compounds, phosphate ions and peroxide ions, followed by drying and calcining of the composition.

b. a catalyst prepared by incorporating in an alumina hydrogel one or more nickel and/or cobalt compounds and one or more molybdenum and/or tungsten compounds in sufficient concentrations to give the finished catalyst a metal content, expressed as metal oxides, of 30–65% by weight, followed by drying and calcining of the composition; the alumina hydrogel in which the metal compounds are incorporated should, after drying and calcining, provide a xerogel having a compacted bulk density of 0.75–1.6 g/ml and a pore volume of 0.15–0.5 ml/g. (c) a catalyst prepared by treating with a hydrogen sulfide-containing gas a composition comprising a carrier, water, one or more water-soluble salts of nickel and/or cobalt and one or more water-soluble salts of molybdenum and/or tungsten at a temperature below 150°C and subsequently heating up the material in a hydrogen-containing gas to a final temperature above 200°C; the amount of water present in the composition to be treated with the hydrogen sulfide-containing gas should correspond with the amount of water present in the composition after drying it in a dry gas at 100°C, increased by 20–120 percent of the amount of water which the dried composition can take up in the pores of the carrier at 20°C.

The hydrogenation of aromatic hydrocarbons according to the invention is carried out by contacting the feedstock with the catalyst at elevated temperature and pressure and in the presence of hydrogen. Suitable hydrogenation conditions are a temperature of 100–400°C, a pressure of 10–200 bar, a space velocity of 0.5–15 $l.l^{-1}.h^{-1}$ and a hydrogen/feed ratio of 50–4000 $Nl.l^{-1}$. The process is preferably carried out under the following condition: a temperature of 200–325°C, a pressure of 20–100 bar, a space velocity of 1.0–10 $l.l^{-1}.h^{-1}$ and a hydrogen/feed ratio of 100–2,000 $Nl.l^{-1}$.

The hydrogenation process can be carried out in the gas phase, the liquid phase or partially in the gas phase and partially in the liquid phase. Use is preferably made of one or more fixed beds consisting of catalyst particles having dimensions of 0.5–3mm.

The invention is further elucidated by the following Examples.

Preparation of a silica-zirconia carrier

A silica-zirconia carrier consisting of 80% by weight of silica and 20% by weight of zirconia was prepared as follows. A silica hydrogel was first prepared by adding 875 ml 6 N $HNO_3$, with stirring, to a solution of 1815 g of sodium water-glass (26.5% of $SiO_2$) in 5500 ml of water. After the silica hydrogel had been aged for 140 hours at 50°C, a solution of 314 g of $ZrOCl_2.8H_2O$ in 1,500 ml of water was added and subsequently 130 ml of concentrated ammonia (25% of $NH_3$) was added, with stirring, over a period of 30 minutes. After stirring for a further 15 minutes the solid material was filtered off and washed with water. From this material a silica-zirconia carrier was prepared by drying the material for 16 hours at 120°C, calcining it for 3 hours at 500°C and crushing it to particles having a diameter of 0.5–1.5 mm.

Preparation of a silica-zirconia-alumina carrier

A silica-zirconia-alumina carrier consisting of 62.7% by weight of silica, 31.3% by weight of zirconia and 6.0% by weight of alumina was prepared as follows. A silica hydrogel was first prepared by adding 345 ml of 6 N $HNO_3$ with stirring to 3312.5 g of an aqueous solution containing 750 g of sodium water glass. After the silica hydrogel had been aged for 24 hours at 50°C, an aqueous solution containing $ZrOCl_2$ and $Al(NO_3)_3$ was added with stirring. This solution was prepared by mixing 1,653.7 g of an aqueous solution containing 259.5 g of $ZrOCl_2.8H_2O$ and 317.0 g of an aqueous solution containing 69.99 g of $Al(NO_3)_3.9H_2O$. Concentrated ammonia was then added, with stirring, to the mixture until the pH of the mixture was 6.0. After stirring for a further 15 minutes the solid material was filtered off and washed with water. From this material a silica-zirconia-alumina carrier was prepared by drying the material for 16 hours at 120°C, calcining it for 3 hours at 500°C and crushing it to particles having a diameter of 0.5–1.5 mm.

Catalyst preparation

Seven catalysts were prepared by impregnating various carrier materials with an aqueous solution of $H_2PtCl_6$, followed by drying and calcining the compositions. The carrier materials used were the silica-zirconia and silica-zirconia-alumina prepared in the manner described above and also two aluminas, a silica, a silica-alumina and a silica-magnesia-alumina. The composition of these catalysts and some of their properties are given in the Table. Catalysts 1 and 2 are catalysts according to the invention. Catalysts A–E are outside the scope of the invention. They have been included for purposes of comparison.

Catalyst testing

Catalysts 1 and 2 and A–E were used for the hydrogenation of aromatics present in desulfurized kerosine. The experiments were carried out under the following conditions. Feed: desulfurized kerosine with a boiling range of 150–250°C, an aromatic content of 15.5% by volume and a sulfur content of 2.5 ppmw.

Temperature: 225°C
Pressure: 50 bar
Space velocity: 6 $l.l^{-1}.h^{-1}$
Hydrogen/feed ratio: 415 Nl of $H_2$/l fresh feed
Recycle ratio (liquid product/fresh feed): 20

Catalyst particle size: 0.5–1.5 mm.

The results of these experiments are given in the penultimate column of the Table. In order to permit comparison of the behaviour of the catalysts (which vary, inter alia, as regards platinum content and density) their activity per gram of platinum is given in the last column of the Table. The activity per gram of platinum was calculated by means of the formula $$k = [a \times (b-c/c) \, 0.6]/[d \times e \times 100],$$

in which $k=$ activity per gram of platinum, $ml.g^{-1}.h^{-1}$
$a=$ space velocity, $ml.ml^{-1}.h^{-1}$
$b=$ aromatics content of the feed, percent by volume
$c=$ aromatics content of the hydrogenated product, percent by vol.
$d=$ platinum content of the catalyst, percent by weight
$e=$ density of the catalyst, $g.m/^{-1}$ Comparison of the catalysts as regards their acitivity per gram of platinum shows that the activities of the catalysts based on silica-zirconia and silica-zirconia-alumina are, respectively, about 240, and 350 percent higher than that of catalyst A. The latter catalyst is the most active of the range of catalysts included in this study for comparison purposes.

What is claimed is:

1. A process for hydrogenating aromatic hydrocarbons which comprises contacting a low sulfur aromatics-containing petroleum distillate having a final boiling point below 375°C at a temperature of 100–400°C, a pressure of 10–200 bar, a space velocity of 0.5–15 $1.1^{-1}.h^{-1}$ and in the presence of hydrogen at a hydrogen/feed ratio of 50–4,000 $Nl.1^{-1}$ with a catalyst having a pore volume of 0.3–1.2 ml/g and a surface area of 100–600 m²/g and containing 0.5–5% wt Group VIII noble metals supported on a carrier comprising 30–90%wt silica, 10–70%wt zirconia and 0–25% wt alumina.

2. The process of claim 1 wherein the catalyst contains 0.1–2% wt of noble metal.

3. The process of claim 1 wherein the catalyst contains platinum as noble metal.

4. The process of claim 1 wherein the catalyst carrier has a silica content which is at least equal to the zirconia content.

5. The process of claim 1 wherein the catalyst carrier has an alumina content which is lower than the zirconia content.

6. The process of claim 1 wherein the hydrogenation of the aromatic hydrocarbons is carried out at a temperature of 200–325°C, a pressure of 20–100 bar, a space velocity of 1.0–10 $1.1^{-1}.h^{-1}$ and a hydrogen/feed ratio of 100–2,000 $Nl.1^{-1}$.

Table

| No. | Catalyst | | Pore volume ml/g | Specific surface | Density g/ml | Aromatics content of hydrogenated product % vol. | Catalyst activity per g of platinum ml.g⁻¹.h⁻¹ |
|---|---|---|---|---|---|---|---|
| | Platinum content % by weight | Carrier (composition in % by weight) | | | | | |
| 1 | 0.5 | 80 SiO₂/20 ZrO₂ | 0.82 | 397 | 0.34 | 4.4 | 0.615 |
| 2 | 0.5 | 62.7 SiO₂/31.3 ZrO₂/6.0 Al₂O₃ | 0.64 | 411 | 0.46 | 2.0 | 0.820 |
| A | 0.87 | Al₂O₃ | 0.65 | 274 | 0.59 | 5.0 | 0.182 |
| B | 0.76 | Al₂O₃ | 0.76 | 185 | 0.45 | 7.8 | 0.174 |
| C | 0.94 | SiO₂ | 1.04 | 334 | 0.37 | 11.5 | 0.092 |
| D | 0.5 | 83 SiO₂/ 17 Al₂O₃ | 0.55 | 351 | 0.43 | 12.4 | 0.121 |
| E | 0.5 | 71.5 SiO₂/27.9 MgO/0.6 Al₂O₃ | 0.41 | 490 | 0.59 | 9.5 | 0.154 |